United States Patent
Striegl

[11] Patent Number: 5,876,083
[45] Date of Patent: Mar. 2, 1999

[54] TOP STORAGE WELL FOR A CONVERTIBLE MOTOR VEHICLE

[75] Inventor: Theodor Striegl, Gangkofen, Germany

[73] Assignee: ED. Scharwächter GmbH & Co., Fahrzeugtechnik, Hengersberg, Germany

[21] Appl. No.: 852,621

[22] Filed: May 7, 1997

[30] Foreign Application Priority Data

May 7, 1996 [DE] Germany .................. 196 18 209.3

[51] Int. Cl.⁶ .................................................. B60R 5/00
[52] U.S. Cl. .................. 296/37.1; 296/136; 296/107.08; 296/124; 296/37.16; 296/76; 296/37.8
[58] Field of Search ................ 296/136, 107.08, 296/124, 37.16, 76, 37.8

[56] References Cited

U.S. PATENT DOCUMENTS

| | | | |
|---|---|---|---|
| 1,748,736 | 2/1930 | Selje | 296/136 |
| 3,170,726 | 2/1965 | Lystad | 296/136 |
| 4,600,233 | 7/1986 | Boydston | 296/136 |
| 4,687,247 | 8/1987 | Muscat | 296/37.16 |
| 4,799,729 | 1/1989 | Muscat | 296/136 |
| 5,035,461 | 7/1991 | Zweigart | 296/107.08 |
| 5,209,544 | 5/1993 | Benedetto et al. | 296/136 |
| 5,322,337 | 6/1994 | Rawlings et al. | 296/136 |
| 5,509,712 | 4/1996 | Rausch et al. | 296/124 |
| 5,527,081 | 6/1996 | Rausch et al. | 296/124 |

FOREIGN PATENT DOCUMENTS

| | | | |
|---|---|---|---|
| 2257668A | 1/1993 | United Kingdom | 296/136 |
| 93014951A1 | 8/1993 | WIPO | 296/136 |
| 94018023A1 | 8/1994 | WIPO | 296/136 |

*Primary Examiner*—D. Glenn Dayoan
*Assistant Examiner*—Long Bao Nguyen
*Attorney, Agent, or Firm*—Anderson, Kill & Olick, P.C.

[57] ABSTRACT

A top storage well for a convertible motor vehicle, which includes a substantially U-shaped body having vertically extending front and rear walls and a substantially horizontally extending floor, and bellows formed of a water-proof flexible material and connectable with the floor and the rear wall, with a floor section of a transverse body section, which connects two legs of the U-shaped body, and a movable middle wall portion of the rear wall being together raisable upward for increasing and adjoining trunk space, and with the bellows being attached to both small sides of the floor section to the middle wall portion of the rear wall, and to stationary side sections of the body floor.

12 Claims, 3 Drawing Sheets

TOP STORAGE WELL FOR A CONVERTIBLE MOTOR VEHICLE

BACKGROUND OF THE INVENTION

1. Field of the Invention

The present invention relates to a top storage well for a convertible motor vehicle and which includes a substantially U-shaped and horizontally extending body including vertically extending front and rear walls and a substantially horizontally extending floor, and bellows means formed of a water-proof flexible material and connectable with the floor and the rear wall, with the floor and the rear wall being divided in at least three sections, and with the floor section of a transverse body section, which connects two legs of the U-shaped body, and a movable middle wall portion of the rear wall being together raisable upward for increasing an adjoining trunk space, the floor section having a plurality of floor parts pivotally connected with each other and with the middle wall portion.

2. Description of the Prior Art

As known, in conventional top storage wells of the type described above and in which the middle floor section is raised upward in order to increase the trunk space when the is closed, there are provided rigid cover flaps for closing the openings of two rigid leg regions of the U-shaped top storage well which are formed during raising of the middle floor section. During the raising of the middle floor section of the top storage well, the flaps should be displaced or pivoted from their essentially horizontal position into a vertical closing position. For effecting this displacement or pivotal movement of the side flaps, a relatively expensive drive assembly is necessary. The drive assembly, on one hand, requires an additional space therefor and, on the other hand, is rather expensive to produce. Furthermore, it is very difficult to achieve an absolutely water-proof seal between the top storage well and the trunk when such rigid flaps are used. In addition to this drawback, another drawback of using the rigid flaps for closing the side openings consists in that it is practically impossible to so attach the flaps in their initial position that they would move noiselessly from the initial position into the vertical position during raising of the middle floor section.

Accordingly, an object of the present invention is to provide a top storage well of the above-described type which would require less space and would be produced with lower costs.

Another object of the present invention is to provide a top storage well which would insure an absolutely water-proof sealing of the side regions of the top storage well with respect to the trunk, while insuring visual view of the trunk.

SUMMARY OF THE INVENTION

This and other objects of the present invention, which will become apparent hereinafter, are achieved by providing a top storage well of the above-described type in which the bellows means is attached, on one hand, to both small sides of the floor parts of the raisable floor section and to the middle wall portion of the rear wall, and is attached, on the other hand to stationary side sections of the body floor. The use of bellows for closing or covering the non-movable, stationary side regions of the top storage well with respect to the trunk, permits to reduce the manufacturing costs and the space occupied by the top storage well. Also, the generation of additional noise is prevented.

To insure that the bellows occupy as little space as possible, it is suggested to use bellows having a single folding line. Using bellows with a single folding line permits to reduce the need in the required mounting space to a minimum which is approximately equal to a double thickness of the bellows material and, therefore, can be practically ignored. The requirement in the mounting space is not significantly by increased when, instead of bellows with a single folding line, bellows with two folding lines are used. For effecting an exact folding of the bellows during lowering of the floor of the top storage well, according to the present invention, there is provided a resilient extendable tension band, which is connected at one end thereof to a stationary side region of the U-shaped body and, at another end thereof, to the bellows in a region of its folding line, for applying a tensile force to the bellows which acts in a folding direction.

Providing a tension band insures that, upon lowering of the middle floor section, the bellows lies flatly on the floor of the top storage well.

The use of bellows for sealing of the side regions of the top storage well with respect to the trunk, enables to provide a simple and easily assembled water-proof connection of the bellows with the movable wall portion of the rear wall and the movable floor section, on one hand, and with the stationary side regions of the top storage box, on the other hand. Specifically, the bellows can be connected with the raisable floor section and the movable wall portion of the rear wall by an appropriate adhesive, e.g., glue, and can be connected to the stationary adjoining floor sections and the stationary adjoining wall portions of the real wall with screw-fastenable strips.

According to a particularly preferred embodiment of the present invention, it is contemplated to form the stationary and rigid side regions of the top storage well of a vehicle body sheet metal and to provide these regions along their portions adjoining the raisable middle floor section and the movable wall portion of the rear wall with creased recesses for receiving the bellows connecting strips. Providing creased recesses not only reduces the required mounting space but insures the most possible optimization of the sealing action of the strips.

According to a more preferred embodiment of the present invention, the stationary, rigid side regions of the top storage well are provided at their end sides adjacent to the movable floor section and the movable wall portion with edge protection guards.

An optical visual view of the trunk space, in a raised position of the movable floor section, can be obtained by providing the bellows with a sight panel. Advantageously, the sight panel is arranged inwardly with respect to the middle section of the top storage well and is connected, with the bellow and the raisable floor section and the movable wall portion of the rear wall, on one hand, and with the adjoining regions of the stationary side regions of the top storage well, on the other hand. To obtain an exact folding of the sight panel, it is connected with the bellows with a rubber resilient extendable tension band, with the band being connected to the bellows at the bellows folding line. Advantageously, for forming the sight panel, an extendable net or similar material is used. The advantage of using such a material consists in that the panel forms a flat wall when the movable floor section is raised, without use of any auxiliary means. Moreover, such a right panel does not require any additional noticeable mounting space.

According to a most preferred embodiment of the present invention, it is further contemplated to form the floor parts of the movable floor section and the movable middle wall portion of the rear wall of rigid plates which are received in pockets formed of a flexible material, with the pockets and the bellows being materially homogeneous. The pockets for receiving the plates are formed of a plastic foil or a waterproof textile fabric. The hinges between the plates, which form the floor parts and the movable middle wall portion of the rear wall, are formed by welding or stitch seams, with the hinges being reinforced by bonded material or foil straps. As a result, the raisable floor of the top storage well, together with the associated movable wall portion of the rear wall and the bellows for closing the stationary side regions of the top storage box, can be produced as a pre-manufactured assembly unit which is mounted by attaching the bellows to the stationary side regions of the top storage box.

According to a preferred advantageous embodiment of the present invention, hinges between the plates, which form the floor parts and the movable wall portion of the rear wall, are formed by welding or stitch seams, dependent on the pocket material. Advantageously, the hinges are reinforced by bonded material straps or foil straps associated with the hinges.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENT

Figure 1:
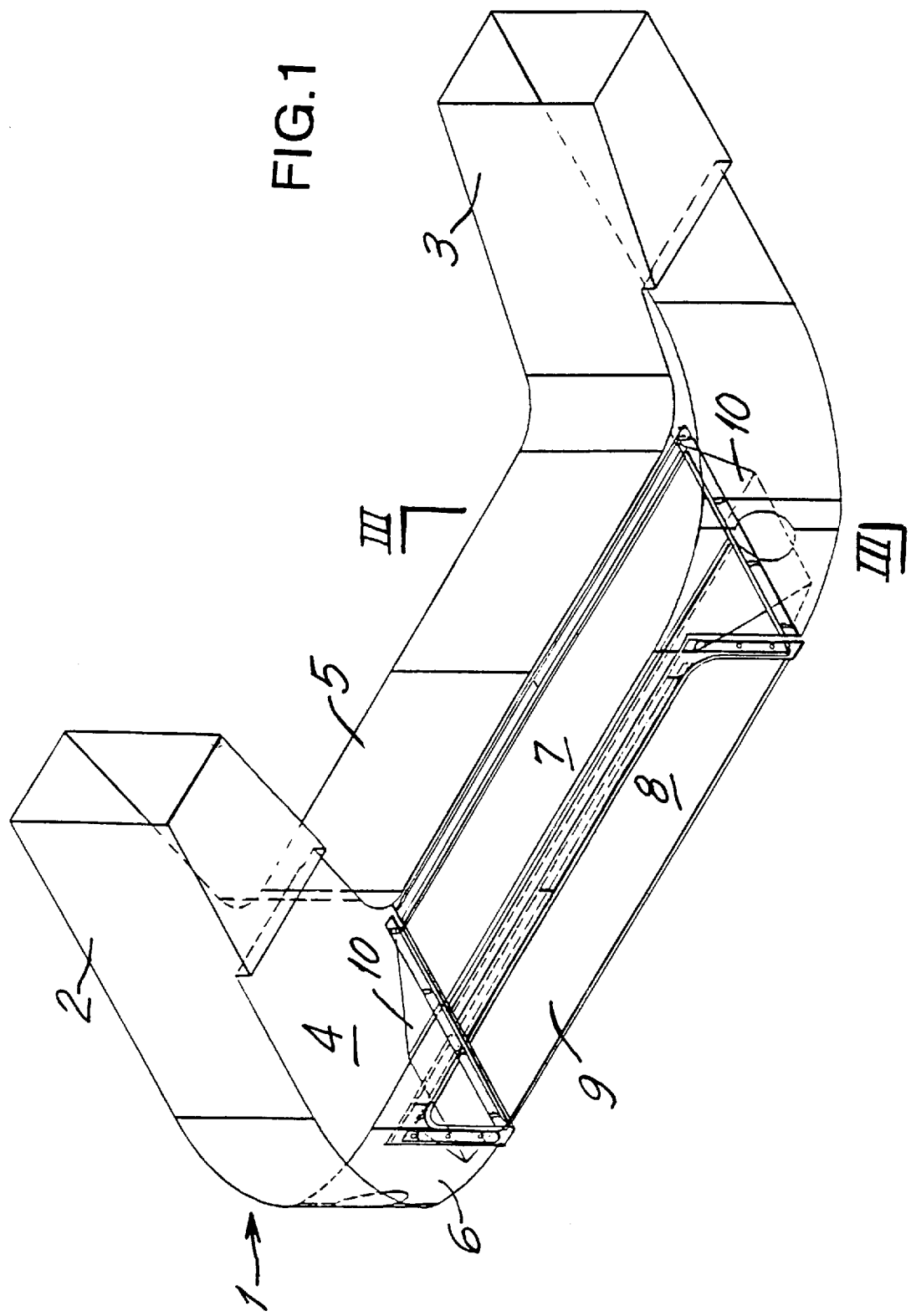
FIG. 1. shows a perspective diagrammatical view of a top storage well according to the present invention for a convertible motor vehicle, which is provided with a raisable floor, in an initial position thereof, with the well floor in its lowered position.
Figure 2:
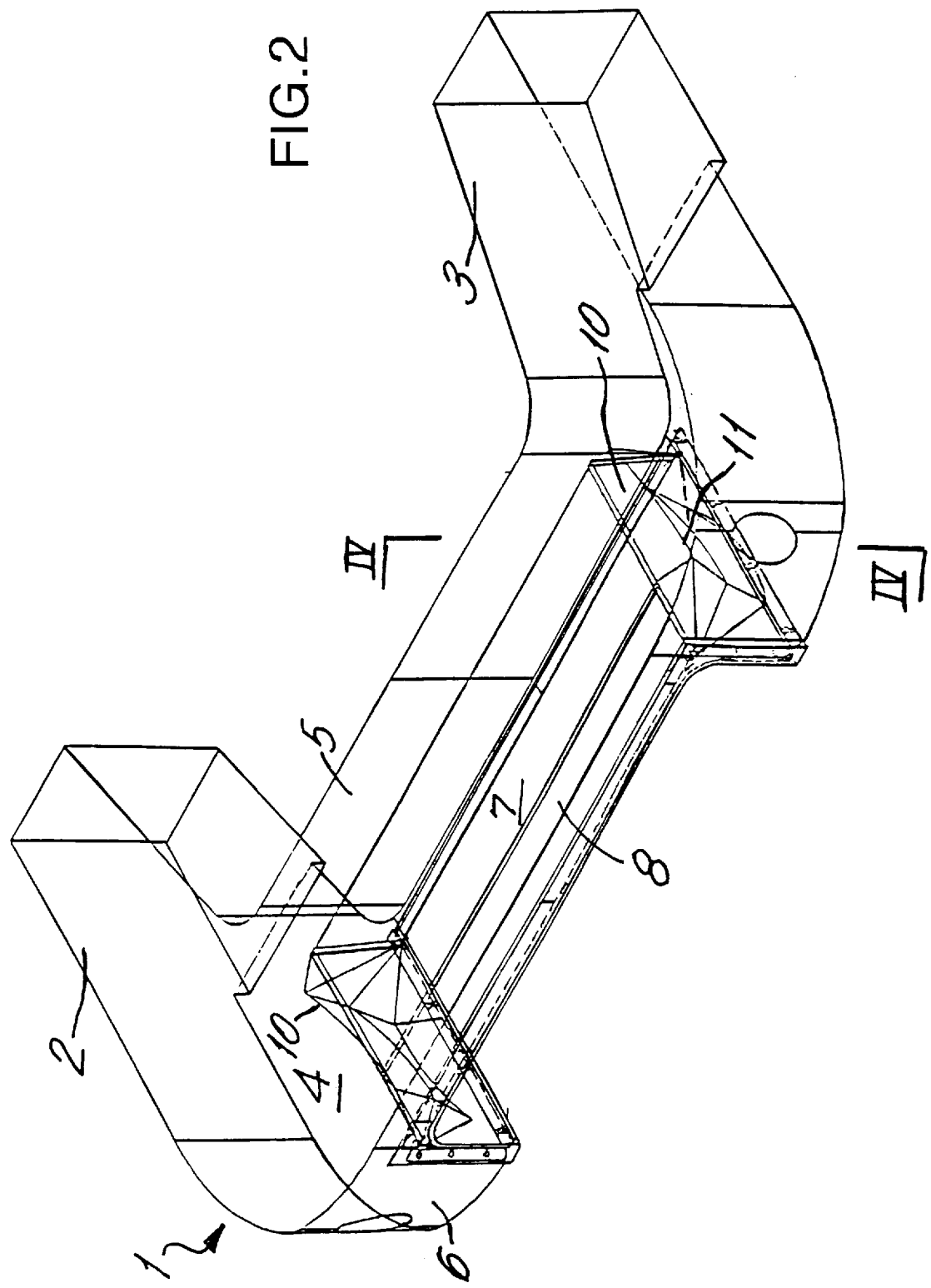
FIG. 2. shows a perspective diagrammatical view of a top storage well according to the present invention for a convertible motor vehicle, which is provided with a raisable floor, in a raised position thereof, in which the well floor is raised.
Figures 3, 4:
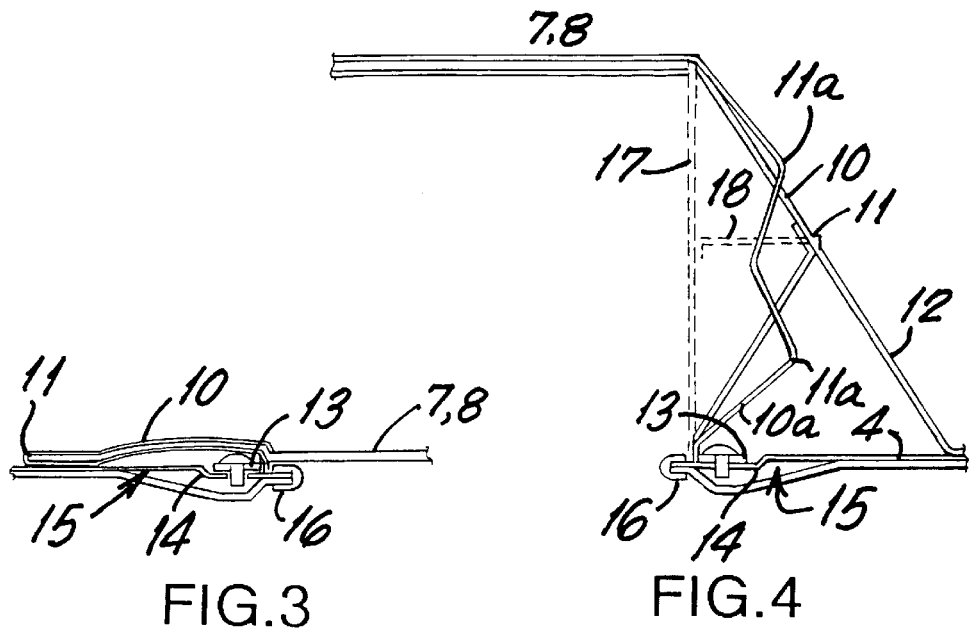
FIG. 3. shows a cross-sectional view of the top storage well shown in FIG. 1 along line III—III.
FIG. 4. shows a cross-sectional view of the top storage well shown in FIG. 2 along line IV—IV.

A top storage well 1 according to the present invention and shown in the drawings is designed for receiving a folding top (not shown) of a convertible motor vehicle (not shown). The top storage well 1 has essentially a U-shaped structure and is arranged in a horizontal plane. The two legs of the top storage well 1 are formed by rigid stationary side members 2 and 3, which are connected by a section which extends transverse to a moving direction of a motor vehicle and is provided with a raisable floor. The top storage well 1 generally has a floor 4 and vertically extending front and rear walls 5 and 6, respectively. The middle portion of the floor 4, which lies in the transverse section of the well 1 is formed of two parts 7 and 8 pivotally connected with each other. The two parts 7 and 8 are further pivotally connected with a movable middle portion 9 of the rear wall 6. Bellows 10, which are formed of a water-proof flexible material, are connected, respectively, to both small sides of the movable parts 7, 8 of the floor 4 as well as to the middle portion 9 of the rear wall 6 and to the side members 2 and 3 at their floor level. The bellows 10 are also connected to portions of the rear wall 6 which lie on opposite sides of the movable portion 9. Each bellows 10 has a folding line 11. An extendable, rubber, resilient band 12, which is secured, at one end thereof, to the floor 4 of the respective adjacent stationary side member 2 or 3 and, at another end thereof, to the respective bellows 10 in the region of its folding line, applies to the bellows a tensile force acting in the folding direction. This tensile force insures an exact folding during lowering of the middle floor parts 7 and 8. The bellows 10, when provided with only one folding line, as shown in FIG. 4, occupies a substantially flat folded position in the initial, lowered position of the floor parts 7 and 8. As further shown in FIG. 4 with dash lines, a bellows, here the bellows 10a, may alternatively be provided with two folding lines, lines 11a in FIG. 4. The bellows 10 form with the movable portion 9 of the rear wall 6 and with the floor portions 7 and 8, on one hand, and with the stationary side members 2 and 3, on the other hand, water-proof connections. The bellows 10 are connected with the both movable floor portions 7 and 8 and with the movable portion 9 of the rear wall 9 with adhesive, and are connected with the respective adjoining end regions 15 of the side members 2 and 3 with strips 13 which are screw-fastened thereto.

The rigid stationary side members 2 and 3, which are formed of a vehicle body sheet, are provided along their regions, which adjoin the movable floor portions 7 and 8, and the movable wall portion of the rear wall 6, with crease-like recesses 14 for receiving the strips 13 with which the bellows 10 are attached to the side members 2 and 3. The side members 2 and 3 are further provided on their end sides, which are adjacent to the movable floor portions 7 and 8 and the movable wall portion 9 of the rear wall 6, with edge protection guards 16.

Transparent panels 17, which are formed of an extendable net or a similar extendable material and which are associated with the respective bellows 10 and are arranged inwardly of the respective bellows 10 with respect to the movable floor portions 7, 8, are connected, on one hand, together with the respective bellows 10, to the movable floor portions 7 and 8 and the movable wall portion 9 of the rear wall 6 and, on the other hand, with the stationary side members 2 and 3. The transparent panels 17 are connected with respective bellows 10 by extendable, rubber, resilient tensile bands 18, with the tensile band 18 being connected with the bellows 10 in the region of the folding line 11 of the bellows 10.

Figure 5:
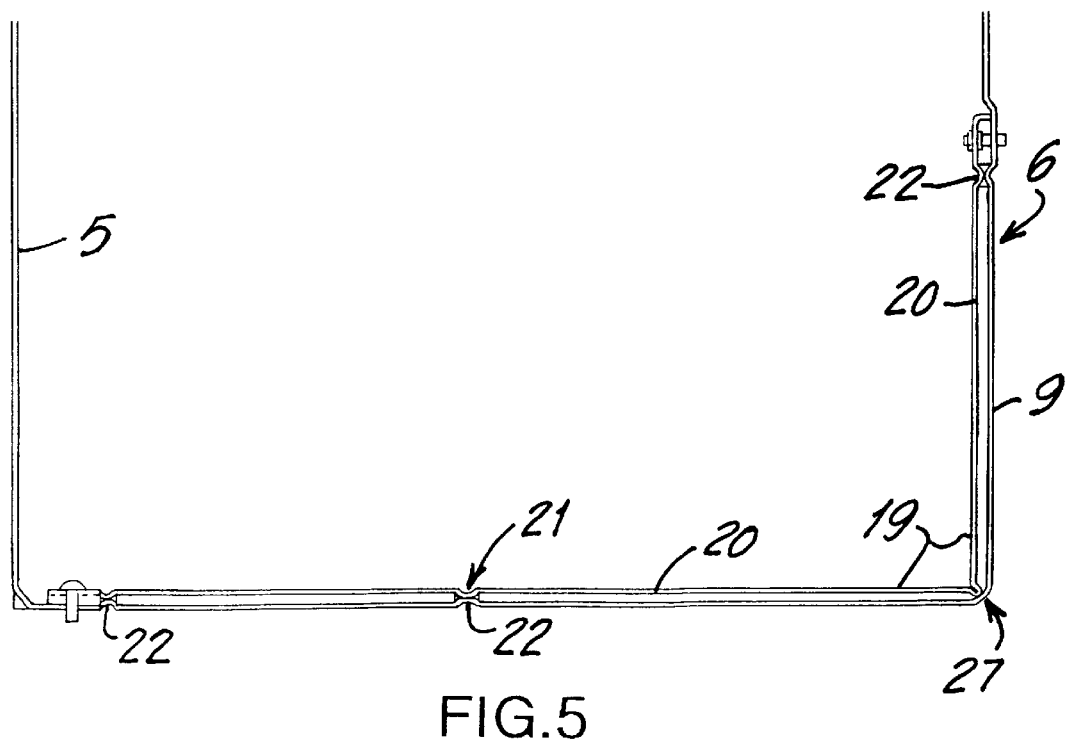
FIG. 5. shows a cross-sectional view of a top storage well shown in FIG. 1 along a bisecting vertical plane of the movable wall portion 9.

As shown in FIG. 5, the movable wall portion 9 of the rear wall 6 and the movable floor portions 7 and 8 are formed of plates 20 which are formed of a light metal or plastic and are received in pockets or bags formed of a flexible material, in particular of a plastic foil or a textile fabric. The necessary pivotal connections or hinges 21 between the floor portions 7 and 8 and the movable wall portion 9 are formed in the shown embodiment by welding seams 22 between respective plates 20.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A top storage well for a convertible motor vehicle, comprising:

a substantially U-shaped and horizontally extending body including vertically extending front and rear walls and a substantially horizontally extending floor; and bellows means formed of a water-proof flexible material and connectable with the floor and the rear wall;

wherein the floor and the rear wall are divided in at least three sections;

wherein a floor section of a transverse body section, which connects two legs of the U-shaped body, and a movable middle wall portion of the rear wall are together raisable upward for increasing an adjoining trunk space, the floor section having a plurality of floor parts pivotally connected with each other and with the middle wall portion, and wherein the bellows means is attached, on one hand, to both small sides of the floor parts of the raisable floor section and to the middle wall portion of the rear wall, and is attached, on the other hand, to stationary side sections of the body floor.

2. A top storage well as set forth in claim 1, wherein bellows means is formed as bellows with at least one folding line.

3. A top storage well as set forth in claim 2, comprising adhesive means for connecting the bellows with the raisable floor section and the movable wall portion of the rear wall, and strips, fastenable with screws, for connecting the bellows to stationary floor sections and stationary portions of the rear wall.

4. A top storage well as set forth in claim 2, further comprising a resilient extendable tension band, connected at one end thereof to a stationary side region of the U-shaped body and, at another end thereof to the bellows in a region of the folding line thereof, for applying a tensile force to the bellows acting in a folding direction.

5. A top storage well as set forth in claim 2, wherein the bellows has a sight panel formed of an extendable net which is arranged inwardly of the bellows with respect to the middle floor portion.

6. A top storage well as set forth in claim 5, further comprising an extendable tensile band connecting the sight panel with the bellows.

7. A top storage well as set forth in claim 2, wherein the floor parts of the movable floor section and the movable middle wall portion of the rear wall are formed of rigid plates received in pockets formed of a flexible material, and wherein the pockets and the bellows are materially homogeneous.

8. A top storage well as set forth in claim 7, wherein the pockets for receiving the plate are formed of one of a plastic foil and a water-proof textile fabric.

9. A top storage well as set forth in claim 7, wherein hinges between the plates, which form the floor parts and the movable middle wall portion of the rear wall, are formed by welding or stitch seams.

10. A top storage well as set forth in claim 9, wherein the hinges are reinforced by one of bonded material straps and bonded foil straps.

11. A top storage wall as set forth in claim 1, wherein stationary side members of the U-shaped body are formed of a vehicle body sheet metal and are provided at the end sides thereof with edge protection guards.

12. A top storage well as set forth in claim 1 wherein the side members along regions thereof which adjoin the raisable middle floor section and the movable wall portion of the rear wall, are provided with creased recesses for receiving strips which are used for connecting the bellows to the U-shaped body.

* * * * *